United States Patent
Hansmann et al.

(10) Patent No.: US 10,664,788 B2
(45) Date of Patent: May 26, 2020

(54) AD-HOC PARCEL DELIVERY DROP ZONE AND HOTSPOT

(71) Applicant: International Business Machines Corporation, Armonk, NY (US)

(72) Inventors: Uwe Hansmann, Tuebingen (DE); Klaus Rindtorff, Weil im Schoenbuch (DE); Thomas Stober, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 15/419,105

(22) Filed: Jan. 30, 2017

(65) Prior Publication Data
US 2018/0218310 A1     Aug. 2, 2018

(51) Int. Cl.
| | |
|---|---|
| *G06Q 10/08* | (2012.01) |
| *H04W 12/06* | (2009.01) |
| *G08B 13/196* | (2006.01) |
| *G06F 21/35* | (2013.01) |
| *G08B 13/14* | (2006.01) |

(52) U.S. Cl.
CPC .......... *G06Q 10/083* (2013.01); *G06F 21/35* (2013.01); *G08B 13/1436* (2013.01); *G08B 13/19647* (2013.01); *H04W 12/06* (2013.01); *G06F 2221/2111* (2013.01)

(58) Field of Classification Search
CPC ........ G06Q 10/08; G06Q 10/00; F41C 33/06; A47B 81/00
USPC ............ 705/339, 26.1; 340/5.51, 5.61, 5.54; 206/317
See application file for complete search history.

(56) References Cited

U.S. PATENT DOCUMENTS

| | | | | |
|---|---|---|---|---|
| 2004/0177008 A1* | 9/2004 | Yang | ...................... | G06Q 10/08 705/26.1 |
| 2014/0035721 A1* | 2/2014 | Heppe | ................ | G07C 9/00912 340/5.54 |
| 2014/0081445 A1* | 3/2014 | Villamar | ................ | G06Q 10/08 700/216 |

(Continued)

FOREIGN PATENT DOCUMENTS

| | | |
|---|---|---|
| CN | 103530911 A | 1/2014 |
| WO | 2014164846 A2 | 10/2014 |

OTHER PUBLICATIONS

Morganti, Elonora et al., "Final deliveries for online shopping: the deployment of pickup point networks in urban and suburban areas", Transport Research Arena 2014, Paris, 10 pgs.

*Primary Examiner* — Olusegun Goyea
(74) *Attorney, Agent, or Firm* — William H. Hartwell; Hunter E. Webb; Keohane & D'Alessandro LLC

(57) ABSTRACT

Aspects of the present invention provide an approach for delivering an item to a target recipient. A mobile guardian device at a first location comprises a wireless communication system. The guardian device is further protected against unauthorized removal from the first location. An item that is delivered to a second location within a communication reach of the guardian device is detected the item by the guardian device. The item is registered with the guardian device, activating an item protection status in which an unauthorized removal of the item from the second location is detected. An authorized removal of the item from the second location is enabled in response to a communication between the guardian device and a removal authentication device.

18 Claims, 5 Drawing Sheets

(56) References Cited

U.S. PATENT DOCUMENTS

| | | | |
|---|---|---|---|
| 2014/0284232 A1* | 9/2014 | Feris | F41C 33/06 206/317 |
| 2015/0120601 A1* | 4/2015 | Fee | G06Q 10/0836 705/339 |
| 2015/0145642 A1* | 5/2015 | Rutledge | G07C 9/00134 340/5.51 |
| 2015/0186840 A1* | 7/2015 | Torres | G06Q 10/0836 705/339 |
| 2015/0356801 A1* | 12/2015 | Nitu | G07C 9/00912 340/5.61 |
| 2017/0027079 A1* | 1/2017 | Dombrowski | H02J 5/00 |
| 2017/0293883 A1* | 10/2017 | Li | G06Q 10/0832 |

* cited by examiner 100 method 102 selecting a first location 104 positioning a mobile guardian device at the first location 106 delivering and item to a second location 108 registering the item using an identifier 110 activating an item protection status 112 enabling an authorized removal of the item

AD-HOC PARCEL DELIVERY DROP ZONE AND HOTSPOT

TECHNICAL FIELD

The subject matter of the invention relates generally to delivering an item, like a parcel, to a target recipient. The invention relates further to a system for delivering an item to a target recipient, and a related computer program product.

BACKGROUND

When delivering mail—like letters or parcels—the last mile is often the most expensive, most time-consuming and most troublesome, both, for a delivery service, as well as for the recipient. The delivery service personnel may not reach the recipient because the recipient is not present at the recipient's address or there may be a long distance between a place for leaving the delivery vehicle and the final destination address.

Series of ideas have been envisioned to improve the situation, e.g., by delivering via a robot or a drone which make the delivery or by using stationary storage boxes from which the recipient may pick up his parcel or letter at any convenient time. However, all of the solutions require complex technical and mechanical equipment in order to safeguard parcels which have not yet been delivered to the final destination, i.e., the recipient.

There are several disclosures related to a method for delivering an item to a target recipient.

Document US 2015/0186840 A1 discloses an electronic smart locker compartment used for convenient and secure delivery and retrieval of parcels. Each locker station may include a set of individual lockers of various sizes, each with an electronically controlled door latch.

Document US 201510120601 A1 discloses a parcel delivery system including a parcel block system for receiving and storing parcels and a portable electronic device used by a person who delivers parcels to the parcel locker. A portable electronic device operated by an intended recipient of the parcel is also used. Encoded tags may be affixed to parcels, and the parcel locker system may comprise a number of individual parcel lockers and the controller device for controlling access to the lockers.

One of the disadvantages of these known solutions may be in the requirement to have lockers to store and protect individual parcels. Such locker systems are heavy and not easy to transport from one place to another. Typically, these locker systems must be located at a fixed place.

Accordingly, there may be a need to simplify the method for delivering parcels to recipients. Such a method and system may be usable by a human based delivery process, as well as an automated delivery process. And it may be highly flexible in space and time.

SUMMARY

According to one aspect of the present invention, a method for delivering an item to a target recipient may be provided. The method may comprise detecting, by a mobile guardian device positioned at a first location, an item delivered to a second location that is within a communication reach of the guardian device. The method may also comprise registering the item on the guardian device via a communication between an identifier on the item and the guardian device. The method may also comprise activating an item protection status in which an unauthorized removal of the item from the second location is detected by the guardian device. The method may also comprise enabling, in response to receipt of a removal authentication signal from the target recipient by the guardian device, an authorized removal of the item from the second location by the guardian device. This method offers several advantages, such as, but not limited to, a secure, automated way to deliver items to many different locations.

The method may optionally further comprising sending, by the guardian device, a set of global positioning system coordinates corresponding to the first location to a delivery service management system. These techniques enable, for example, the ability to establish a new location for the global positioning system.

The method may optionally further comprise detecting, by the guardian device, whether an unauthorized removal of the guardian device from the first location has occurred; detecting, by the guardian device, whether a number of recognized removal authentication devices exceeds a predetermined threshold number in an area of the communication reach; and triggering an alarm in response to any of: an unauthorized removal of the item from the second location, an unauthorized removal of the guardian device from the first location has occurred, or that a number of recognized removal authentication devices exceeds a predetermined threshold number in an area of the communication reach. These techniques enable, for example, the ability to secure both the item and the guardian device in several different ways.

The method may optionally further comprise embodiments in which the detection of whether an unauthorized removal of the guardian device from the first location has occurred further comprises: monitoring the global positioning coordinates of the guardian device; monitoring a motion sensor; and activating the alarm upon unauthorized removal. These techniques enable, for example, the ability to secure the mobile guardian using multiple sensing solutions.

The method may optionally further comprise receiving the removal authentication signal from a removal authentication device associated with the target recipient, wherein the removal authentication signal contains a removal code. These techniques enable, for example, the ability to validate a target recipient removing an item.

The method may optionally further comprise forwarding to the removal authentication device directions to the guardian device. These techniques enable, for example, the ability to change a location of the guardian device and to provide current directions to the target recipient.

The method may optionally further comprise detecting a new identifier by the guardian device; sending from the guardian device a drop activation request to the removal authentication device; and confirming a dropping of a new item with the new identifier in the communication reach of the guardian device. These techniques enable, for example, the ability to manage multiple items by the guardian device.

The method may optionally further comprise embodiments in which the guardian device comprises a camera adapted for monitoring the communication reach of the guardian device, and the enabling of the authorized removal is activated by a face recognition system. These techniques enable, for example, the ability to identify target recipients using facial recognition.

According to another aspect of the present invention, a mobile guardian device for delivering an item to a target recipient may be provided. The guardian device may comprise a wireless communication system, configured to:

detect an item delivered to a second location that is within a communication reach of the guardian device; and register the item on the guardian device via a communication between an identifier on the item and the guardian device; and an item protection system configured to: activate an item protection status in which an unauthorized removal of the item from the second location is detected; and enabling, in response to receipt of a removal authentication signal from the target recipient, an authorized removal of the item from the second location.

Furthermore, embodiments may take the form of a computer program product for controlling delivery of an item to a target recipient, the computer program product comprising a computer readable storage medium, having program instructions embodied therewith, the program instructions being executable by one or more computing systems associated with a mobile guardian device to cause the one or more computing systems to: detect, at a first location occupied by the guardian device, an item delivered to a second location that is within a communication reach of the guardian device; register the item via a communication between an identifier on the item and the guardian device; activate an item protection status in which an unauthorized removal of the item from the second location is detected; and enable, in response to receipt of a removal authentication signal from the target recipient, an authorized removal of the item from the second location by the guardian device.

BRIEF DESCRIPTION OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1:

Preferred embodiments of the invention will be described, by way of example only, and with reference to the following drawings:

FIG. 1 shows a flow diagram of an embodiment of the inventive method for delivering an item to a target recipient.

Figure 2:
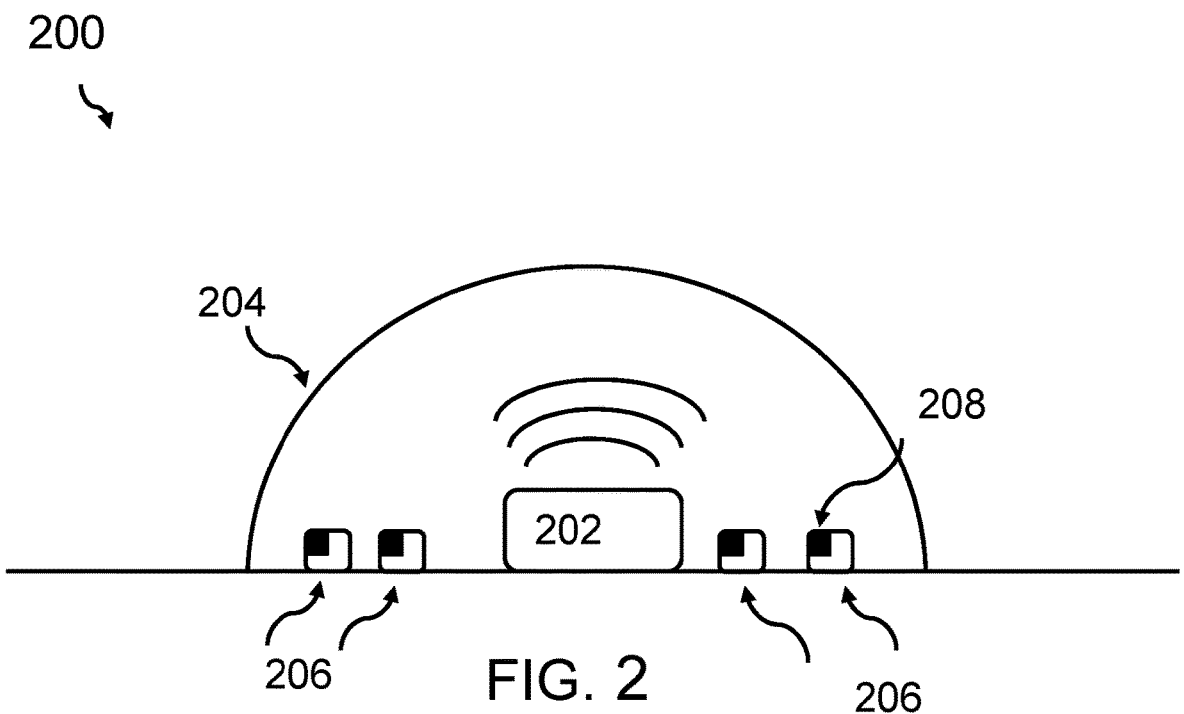

FIG. 2 shows a block diagram of a graphical representation of the drop zone, the guardian device and a plurality of parcels with identifiers.

Figure 3:
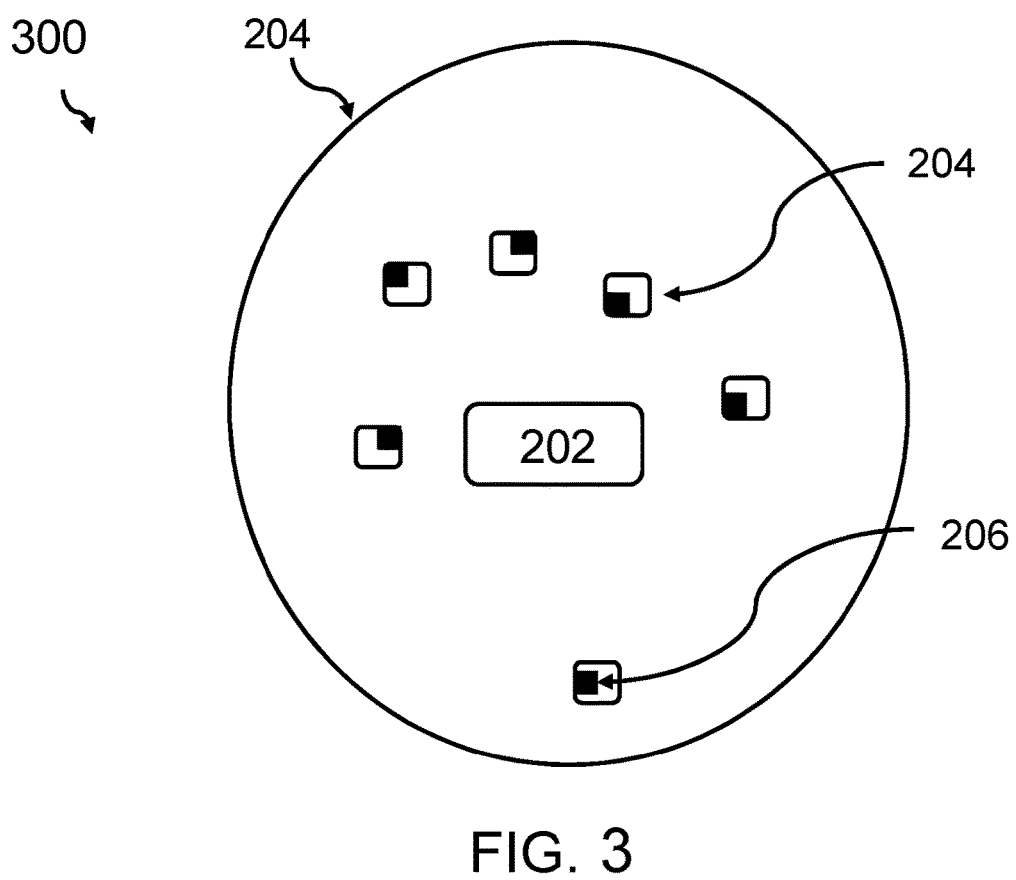

FIG. 3 shows a block diagram of a top few of the drop zone.

Figure 4:
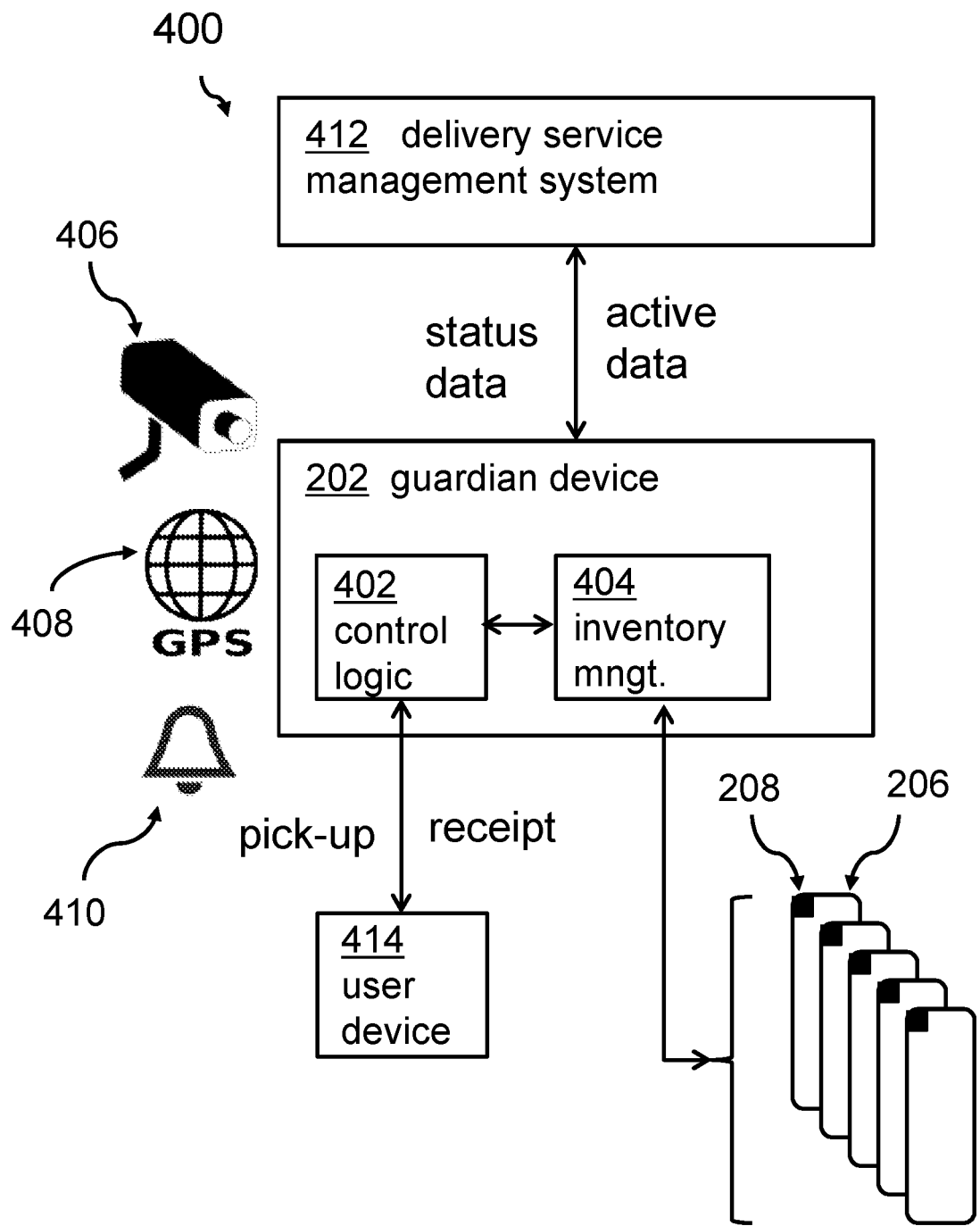

FIG. 4 shows a block diagram of an embodiment of several components of the system for delivering an item to a target recipient.

Figure 5:
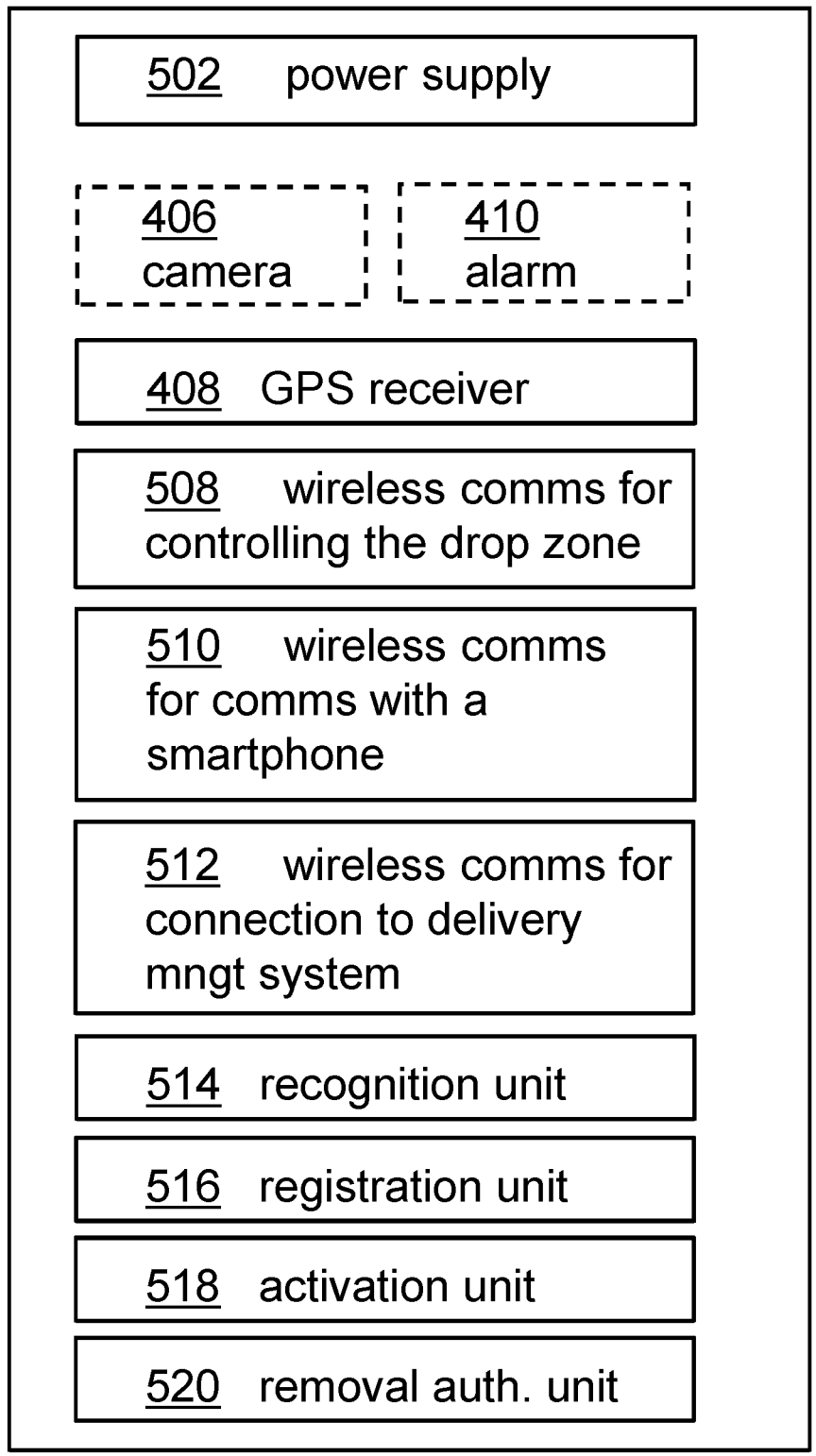

FIG. 5 shows a block diagram of an embodiment of the guardian device.

Figure 6:
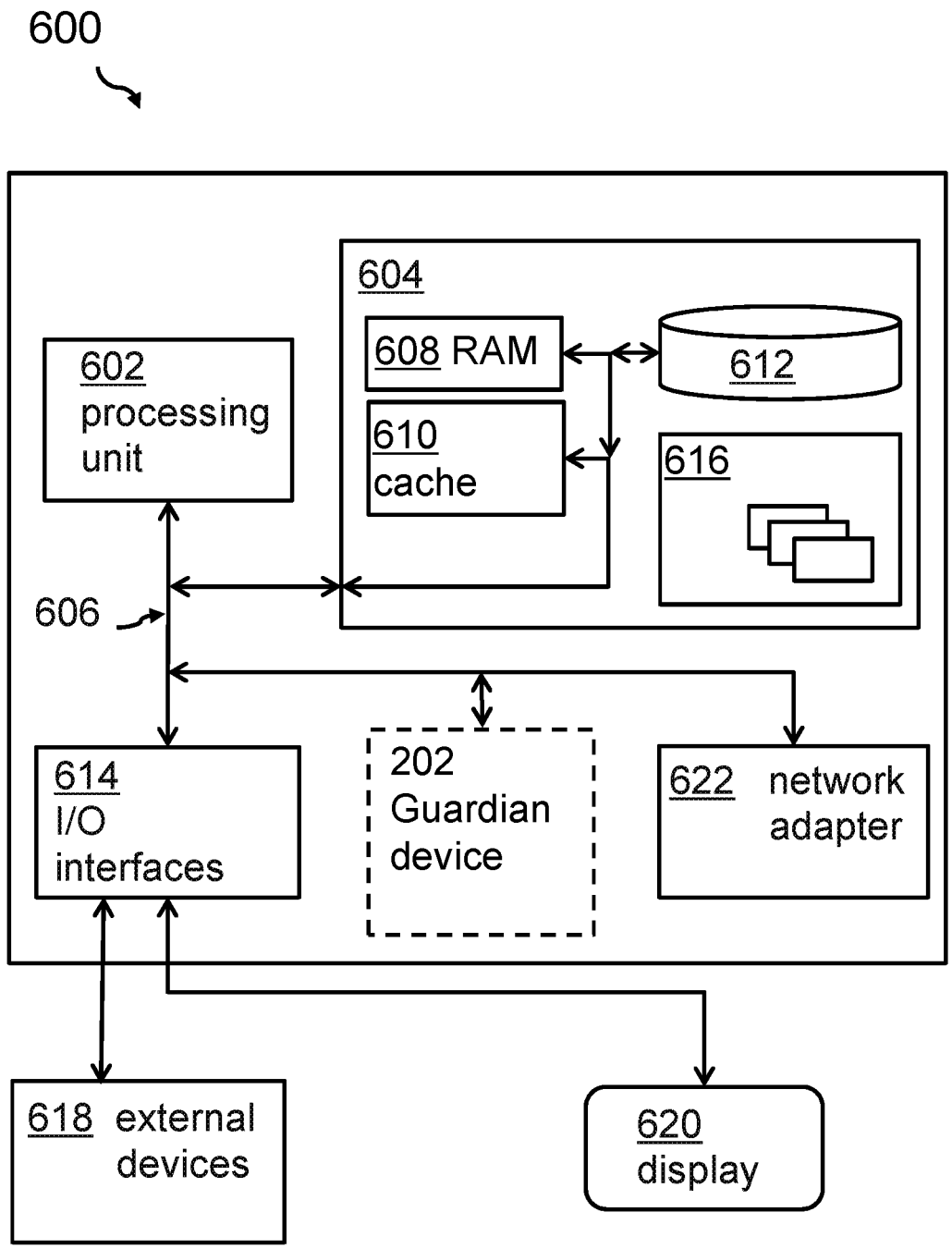

FIG. 6 shows a block diagram of an embodiment of a computer system suitable for controlling delivery of an item to a target recipient.

DETAILED DESCRIPTION

In the context of this description, the following conventions, terms and/or expressions may be used:

The term 'item' may denote something a recipient should receive by way of a delivery service, such as a physical mail service, a parcel delivery service or the like. In this sense, the item may include a parcel, a letter or any other physical item. It may be noted that in the context of this document the terms item and parcel may be used as synonyms.

The term 'target recipient' may denote the intended receiving person or organization of the parcel to be delivered. The organization may be represented by a receiving person.

The term 'guardian device' may denote a physical device equipped with at least one wireless communication interface. The guardian device may also be denoted as mobile guardian device because of its character to be placed anywhere. The primary wireless communication capabilities may have the reach of several meters around the guardian device. It may detect an identifier via, e.g., the Bluetooth communication standard (e.g., Bluetooth 4.0 or higher), a Wi-Fi communication connection, or by near future communication (NFC, e.g., RFID-based). Alternative communication methods between the guardian device and the identifier may be used, e.g., optical, infrared and so on (using, e.g., a barcode or a QR code). Additionally, the guardian device may be equipped optionally with a secondary communication interface for a long-range mobile communication. Furthermore, the guardian device may have regular computing capabilities including a central processing unit (CPU), random access memory (RAM) and a long-term storage. The guardian device may be adapted to execute software programs and it may have a power supply.

The protection zone, or drop zone, may denote the area of or an area within the primary wireless communication capabilities. By default, the communication reach may—in this document—relate to the primary wireless communication capabilities.

The term 'second location' may denote—in contrast to the first location where the mobile guardian device is positioned—a position of the item. The second location may lie in the protection zone of the guardian device, in the communication reach of the primary wireless communication capabilities.

The term 'item protection status' may denote a mode of operation of the guardian device in which the guardian device may supervise that the items equipped with an identifier remain within the communication reach (e.g., primary wireless communication capabilities) of the guardian device.

The term 'authorized removal' may denote that a recipient may be allowed to remove an item from the protection zone—e.g., the primary communication reach—of the guardian device. The recipient may identify himself/herself using a removal authorization device such as, a mobile device, e.g., a smart phone, a smart card or the like. In this sense, the term 'removal authentication device' may denote a physical device together with a code which may be identified by the guardian device. As a consequence, the guardian device may disable the item protection status for the item in question identified by the identifier.

The term 'delivery service management system' may denote a central (or also decentralized) system, having information about positions of guardian devices, delivery statuses of items, recipients, distributed codes for an allowed removal of an item being a part within the communication reach of a guardian device and other information required to manage an item delivery process to a plurality of recipients.

The proposed method for delivering an item to a target recipient offers multiple advantages and technical effects:

The herewith proposed technical concept can be used with an automatic machine-based distribution of parcels, as well as, to a classical, human based distribution and delivery of parcels. However, the parcels are not delivered to the recipient directly, but to a variable location defined by the position or location of the guardian device.

The items can be protected by the guardian device by way of wireless communication between the guardian device and an identifier stuck to the item. The items may, or may not, also be protected by physical methods and devices, like mailboxes or other closed containers.

The parcel delivery service can drop a group of parcels potentially addressed to a plurality of recipients at any convenient location for an establishment of a mobile pickup system and can include a theft protection for the parcels at that particular delivery location. The guardian device can be positioned at random places based on optimization criteria chosen by the delivery service, e.g., the delivery service management system. Such criteria may be, e.g., based on a route of a delivery vehicle and, e.g., be based on an accumulation of recipients in a certain neighborhood. The ad-hoc position of the guardian device can be chosen and changed day by day, based on the daily actual parcel delivery requirements. The ad-hoc position can be chosen to be at an easily accessible place (e.g., without stairs, gates or other obstacles). This way, delivery robots—like drones or wheel-based robots—may also be able to reach the second position around the guardian device easily. In this sense, the protection zone around the guardian device can be used as a drop zone for those autonomic parcel delivery vehicles.

Furthermore, the ad-hoc position can also be used as a target destination for an automatic, semi-automatic or manual collection of parcels to be delivered to other recipients. Also in this case—e.g., the collection mode—the parcels can be protected by the guardian device.

The drop zone—i.e., the location around the guardian device—can be a public place where it may be accessed easily by end-users as well as members of the delivery service. The drop zone may be either static or set up on demand in an appropriate area. Because of the protection mode for parcels placed in the drop zone, there may be no need for mechanical or structural precautions to safeguard the parcels. Thus, the electronic protection by the guardian device may significantly reduce costs for the protection of items to be delivered. In order to move a drop zone from one location to another, only the position of the guardian device has to be changed.

In the following additional embodiments of the method and the system for delivering an item to a target recipient will be described:

According to an embodiment of the method, the guardian device can be enabled to send its global positioning system (GPS) coordinates to a delivery service management system. This can be performed by a mobile communication network or also by Wi-Fi assuming that a Wi-Fi net signal is receivable from the neighborhood of the position of the guardian device. A nearby public or private Wi-Fi hotspot may be instrumental for achieving this. In comparison to classical mobile long range communication, this may reduce communication cost. This way, a central delivery service management can be informed about the location of the guardian device. This information can be used to direct a parcel delivery vehicle (manned or unmanned) to the guardian device. Additionally, the delivery service management system can activate an alarm in response to an unauthorized removal of the guardian device.

According to an additional embodiment of the method, an alarm can be triggered in case of an unauthorized removal of an item from the protection zone (e.g., (primary) communication reach). The alarm signal can be an acoustical and/or an optical local signal directly from the guardian device. Additionally or in the alternative, a message can be sent to the delivery service management system and/or a mobile device of nearby service personnel. Further, the guardian device can activate a still or video camera to capture the scene of the unauthorized removal of the item. This may help to protect the items against theft.

According to a further embodiment of the method, the alarm can also be triggered if a number of recognized removal authentication devices exceed a predetermined threshold number in the area of the communication reach. This can be achieved by counting the number of MAC addresses in the communication reach of the guardian device. A high number of potential recognized removal authentication devices or simply mobile devices, not enabled for an authorized removal of an item, may be an indicator for a planned theft of items, i.e., parcels.

According to an embodiment of the method, a removal authentication device receives a removal code. The removal authentication device can receive the removal code from the delivery service management, and it can use it for an authorized removal of the item from the protection zone (e.g., the communication reach) of the guardian device for protecting the parcels. The removal authentication device may communicate—e.g., wirelessly—the received removal code to the guardian device. The guardian device may also have received a matching removal code from the delivery service management system. On a match of the two codes, no alarm will be turned on in case the item in question is removed.

According to another useful embodiment of the method, the removal authentication device can receive directions to the guardian device. This can enable the user of the removal authentication device to easily find the—potentially varying over time—locations of the guardian device and thus the drop zone of the parcels. This may enhance the user-friendliness of the proposed concept.

According to a further embodiment, the method can also comprise detecting a new identifier by the guardian device, sending from the guardian device a drop activation request to the removal authentication device, and confirming a dropping of a new item with the new identifier within the communication reach—in particular the drop zone—of the guardian device. This way, the drop zone around the guardian device can be used, not only by the parcel delivery service for delivering items/parcels to recipients, but also as a pick-up point for a reception of parcels and later delivery to other recipients. Thus, the guardian device including the surrounding drop zone can be used as a place for incoming and outgoing parcels to the parcel delivery service.

In case of an authentication by an ID card or smartcard, the guardian device can be equipped with an optical scanner for the ID card and/or a smartcard reader. Thus, the technical concept proves to be highly flexible and adaptable to various local situations.

According to an embodiment of the method, the communication between the guardian device, the identifier and/or the removal authentication device can be performed in a secure manner. Such an encrypted communication method may enhance the security of the overall system and parcel delivery process.

According to various embodiments of the method, the wireless communication device can be enabled for a wireless communication based on at least one selected out of the group comprising Wi-Fi communication, an RFID-based communication, Bluetooth communication, optical communication (using barcodes or QR codes as identifiers), infrared-based communication, and mobile telephone communication. In order to achieve the protective character of the guardian device, a limited defined space around the guardian device—e.g., several meters or several centimeters—is reachable by the primary wireless communication. This area can be named and used as drop zone; or protected zone.

According to a further preferred embodiment of the method, the protection against unauthorized removal—e.g., theft—of the guardian device from the first location can be performed by monitoring the global positioning coordinates of the guardian device or by monitoring a motion sensor—e.g., in form of a gyroscope, accelerometer, and/or other motion sensors inside the guardian device—and activating an alarm upon unauthorized removal. Hence, the guardian device can protect itself. This self-monitoring can be deactivated if the guardian device may needs to be moved to a different position by service personnel—or an automated relocator—of the delivery management system. The self-monitoring status can be activated again after the guardian device has reached its new position.

According to an additional embodiment of the method, the guardian device can comprise a camera—video or still—adapted for monitoring the area of the primary communication reach of the guardian device. In case of an assumed unauthorized removal of an item from the drop zone the camera can capture the removal process. This can be used as deterrence against unauthorized removal and/or as a basis to identify parcel thieves.

According to a further embodiment of the method, enabling the authorized removal can be activated by a face recognition system. In order to do so, the guardian device can receive an image of the face of the person that is authorized to remove a specific item. The guardian device can receive such an image by the delivery management system. Users of this way of delivery of parcels may have registered with the delivery management system beforehand and may have delivered the required image and a mobile phone number or email address for the removal authentication device (in case no face recognition can be used).

In the following, a detailed description of the figures will be given. All instructions in the figures are schematic. First, a block diagram of an embodiment of the inventive computer-implemented method for delivering an item to a target recipient is given. Afterwards, further embodiments, as well as embodiments of the system for delivering an item to a target recipient, will be described.

FIG. 1 shows a block diagram of an embodiment of the method 100 for delivering an item to a target recipient. The recipient may be a natural person or an organization represented by a natural person. The person may carry a smart phone device or another dedicated device as a removal authentication device. The method 100 comprises selecting, 102, a first location that is accessible by the target recipient. Any place may be selected as first location including, but not limited to: a public place like a bus station, an entryway of an apartment or public building, a train station, or any other easy accessible location. No special requirement has to be met. A new first location can be chosen each time the first location is selected. This may be, e.g., on a daily basis depending on optimization rules depending on parcels to be delivered to target persons.

The method 100 comprises also positioning, 104, a guardian device—in particular, a mobile guardian device—at the first location. The guardian device includes a (primary) wireless communication system that can communicate within a range, which can be anywhere from a couple of centimeters to a couple of meters. Additionally, the guardian device can comprise a second transceiver that can perform a long range mobile communication such as a mobile phone module. The guardian device is also protected against an unauthorized removal from the first location. This may be performed in a number of different ways. The guardian device can be physically locked to a solid element like a house, a wall, a post, etc. Alternatively, or in addition, the guardian device can determine its own movement by means of GPS data or acceleration sensors. In case of an unauthorized movement of the guardian device an alarm can be enabled. In case the guardian device has to be moved to a different location, the just described self-protection mechanism can be disabled.

The method 100 comprises further delivering, 106, the item to a second location. This second location can also be referred to as the drop zone. The item can be a parcel, a letter, a box or any other physical element adapted to carry the identifier outside or inside the element. In particular, the item is delivered to a location within a communication reach of the guardian device, having a near range communication device. The identifier may be enabled for a near range communication, using any of the following: RFID-based communication, Wi-Fi-based communication, Bluetooth communication, NFC based communication (Near Field Communication), a light based communication (optical), an infrared based communication system, and/or the like. This allows the guardian device to detect a presence of the item within its communication reach, e.g., in the drop zone.

The method 100 also comprises registering, 108, the item, using the identifier that has been associated with the item. This registering can be performed via a communication, using the wireless communication device within the guardian device. For example, prior to a delivery of the item in the drop zone, a communication that contains information that the item is expected to be dropped in the drop zone can be sent to the guardian device.

Furthermore, the method 100 comprises activating, 110, an item protection status in which an unauthorized removal of the item from the second location is detected by the guardian device and is prevented. For example, in case an unauthorized removal happens, an alarm is triggered.

Thus, the method 100 comprises enabling, 112, an authorized removal of the item from the second location, using a secure communication that receives a removal authentication signal at the guardian device. The removal authentication signal can be received from a removal authentication device. This can be a smartphone with an appropriate application—and potentially a removal code—installed. However, a smart card or another identifier card can also be used for an authentication of a recipient.

FIG. 2 shows a block diagram 200 of a graphical representation of the drop zone 204, the guardian device 202 and a plurality of parcels 206 with identifiers 208. The guardian device 202 may include a transceiver with a certain reach, symbolized by half circle 204 which also represents the drop zone 204. This diagram may represent a situation in which the guardian device 202 may just have been positioned at any surface. It may be noted that the parcels 206 can be placed at any location within the communication reach 204 of the guardian device 202. No special requirements have to be reflected, in particular, no lockers are required.

FIG. 3 shows a block diagram 300 of a top view onto the drop zone 204. Again, the guardian device is positioned in the middle of the circle 204 that represents the communication reach of the guardian device 202 for communicating with the identifiers 208 of the parcels 206. However, any other spherical configuration is possible.

FIG. 4 shows a block diagram 400 of an embodiment of several components of the system for delivering an item to a target recipient. The guardian device 202 can comprise at least control logic 402 and an inventory management unit 404. Not shown here are the transceivers required within the guardian device 202. The inventory management unit 404 can be adapted to receive the identification numbers of the identifiers 208 of the parcels 206. This way, the guardian device 202 can keep track of parcels 206 within the guardian device's 202 drop zone 204.

The guardian device 202 can also be connected to a series of sensors, like a camera (still of video) 406, a GPS receiver 408 and/or an alarm system 410. Additionally, the guardian device 202 can also comprise movement sensors such that a movement of the guardian device 202 can be detected without using the GPS receiver 408.

If a package has to be delivered to a target recipient, the delivery service management system first determines which of a plurality of guardian devices 202 is proximate to the potential recipient of the parcel. Once the guardian device has been selected, the delivery service management system 412 can trigger the delivery of the parcel 206 with a unique identifier 208 into the protection zone—e.g., the communication reach of the guardian device 202—by service personnel or an automatic parcel delivery system, such as a drone or a robot. These active data—including the identifier code—can be communicated to the guardian device 202. Once the parcel 206 reaches the drop zone of the guardian device 202, the parcel 206 can be checked-in into the inventory management unit 404 of the guardian device 202. At the same time, a recipient can be informed via, e.g., his smart phone that a parcel 206 is ready for a pickup at a certain location of the guardian device 202. The smart phone can also receive directions how to reach the guardian device 202, and thus, the parcel 206 in the easiest way. Additionally, the user device/smart phone can also receive the code relating to the identifier 208.

If the user with his user device 414 reaches the drop zone of the guardian device 202, the user device 414 can be identified by means of a wireless communication from the guardian device 202 to the user device 414. The two devices can exchange data about the code for the parcel 206 to be picked up. In case of a match, the inventory management unit 404 can check out the parcel 204 in question with the related identifier 208. Now the user can pick up the parcel 206—which may also have a visually recognizable identifier like the name and the address of the recipient or another suitable code—and leave the drop zone of the guardian device 202 without activating the camera, the alarm or any other theft protection device of the guardian device 202. In one embodiment, the same transceiver used for a communication with the identifiers 208, can also be used as for a communication with the user device 414.

In case a user without the appropriate code in his/her user device/smart phone 414 tries to remove the parcel 206 from the drop zone/protection zone of the guardian device 202, an alarm 410 can be activated, the camera 406 can be activated to capture the theft scene, and/or the delivery service management system 412 can also be informed. Thus, status data of the guardian device 202 can be communicated, e.g., by a mobile communication transceiver (alternatively, by a Wi-Fi signal using a public Wi-Fi hotspot) to the delivery service management system 412. In addition, the delivery service management system 412 delivers active data about parcels 206 with an identifier 208 data to be delivered.

In an embodiment, a user—in this case a sender of a parcel—can position the parcel 206 to be picked up into the drop zone of the guardian device 202. Using his user device 414, information about the parcel 206 can be transmitted via the guardian device 202 to the delivery service management system 412 or directly from the user device 414 to the delivery service management system 412. Once the check-in process into the drop zone of the guardian device 202 is finalized, the item protection status will be enabled for this newly received parcel 204. The sender of the parcel 206 can place the identifier 208 (e.g., in the form of a sticker), comprising the required electronic components, onto the parcel or inside the parcel.

Because of the item protection status for parcels placed in the drop zone, there may be no need for any additional mechanical or structural precautions to safeguard the parcels 204. To move the drop zone, the guardian device 202 only needs to be moved to another place.

It may be noted that in the above-described scenario, the user device 414 can also be seen as the removal authentication device. The identification of the user device 414 can, e.g., be accomplished by an application, being executed on the user device and a related code or by making the MAC (media access control) address of the user device 414 be known to the guardian device 202. The guardian device 202 can receive the MAC address from the delivery service management system 412 in which the user device 414 has been registered as a device belonging to the recipient.

FIG. 5 shows a block diagram of an embodiment of the guardian device 202. The guardian device 202 can include a power supply 502—like a battery—in order to make the guardian device 202 independent from external power sockets. The GPS receiver 408 may be instrumental in detecting an un-allowed movement of the guardian device 202. The camera 406 can be used in case of an un-allowed movement of the guardian device 202 or an unauthorized removal of a parcel from within the drop zone of the guardian device 202. The alarm 410 (optical and/or acoustical) can be activated in case of any unauthorized activities—e.g., a non-authorized removal of a package or other allowed movement of the guardian device—around the guardian device 202. A transceiver 508 can also be included for communicating with the identifiers of the parcels. The reach of such communication technology may be in the range of a couple of centimeters to several meters. The already above-mentioned technologies may be used.

Additionally, a communication system 512 for a communication with the delivery service management system can also be included. This can be based on a mobile communication. In case of a Wi-Fi hotspot, this technology can also be used alternatively. Thirdly, communication capabilities 510 can also be included within the guardian device 202 to communicate with the user device. Some of the required transceivers for the different communication targets can be used for two or more purposes. Thus, if the drop zone may be protected by a Wi-Fi signal, this Wi-Fi signal can also be used for a communication to the user device. On top of this, the same Wi-Fi transceiver can also be used to communicate to the service delivery management system if a Wi-Fi hotspot is within the drop zone.

The guardian device 202 can also include a recognition unit 514 that can recognize an item positioned in the second position within the communication reach of the guardian device 202. A registration unit 516 can be part of the inventory management unit 404 (compare FIG. 4). Furthermore, the guardian device 202 comprises an activation unit 518 which is adapted for activating an item protection status in which an unauthorized removal of the item from the second location is detectable by the guardian device 202. Finally, the guardian device 202 comprises a removal authorization unit 520 that allows for a removal of the parcel from within the communication reach (reference numeral 204 of FIGS. 2, 3) of the guardian device 202 for the item from the second location.

Embodiments of the invention can be implemented together with virtually any type of computer, regardless of the platform being suitable for storing and/or executing program code. FIG. 6 shows, as an example, a computing system 600 suitable for executing program code related to the proposed method. In particular, the guardian device 202 can represent an extended version of the computing system 600.

The computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules can include routines, programs, objects, components, logic, data structures, and so on that perform particular tasks or implement particular abstract data types. Computer system/server 600 can be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 can include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 can include computer system readable media in the form of volatile memory, such as random access memory (RAM) 608 and/or cache memory 610. Computer system/server 600 can further include other removable/non-removable, volatile/non-volatile computer system storage media. By way of example only, storage system 612 can be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

A program/utility, having a set (at least one) of program modules 616, can be stored in memory 604 by way of example, and not limitation, as well as an operating system, one or more application programs, other program modules, and program data. Each of the operating system, one or more application programs, other program modules, and program data or some combination thereof, can include an implementation of a networking environment. Program modules 616 generally carry out the functions and/or methodologies of embodiments of the invention as described herein.

The computer system/server 600 can also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via input/output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 can communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the guardian device 202 can be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for delivering an item to a target recipient, the method comprising:
    relocating a mobile guardian device from a previous first location to a first location, wherein the previous first location is a location at which the mobile guardian device has been accepting deliveries;
    sending, by the mobile guardian device, a set of global positioning system coordinates corresponding to the first location to a delivery service management system in response to a new arrival of the guardian device at the first location as a result of the relocating;
    detecting, by the mobile guardian device positioned at the first location, an item delivered to a second location that is a non-enclosed area that is external to the mobile guardian device and is within a communication reach of the guardian device;
    registering the item on the guardian device via a communication between an identifier on the item and the guardian device;
    activating an item protection status in which an unauthorized removal of the item from the second location is detected by the guardian device; and
    enabling, in response to receipt of a removal authentication signal from the target recipient by the guardian device, an authorized removal of the item from the second location by the guardian device.

2. The method according to claim 1, further comprising:
    detecting, by the guardian device, whether an unauthorized removal of the guardian device from the first location has occurred;
    detecting, by the guardian device, whether a number of recognized removal authentication devices exceeds a predetermined threshold number in an area of the communication reach; and
    triggering an alarm in response to any of: an unauthorized removal of the item from the second location, an unauthorized removal of the guardian device from the first location has occurred, or that a number of recognized removal authentication devices exceeds a predetermined threshold number in an area of the communication reach.

3. The method according to claim 2, wherein the detection of whether an unauthorized removal of the guardian device from the first location has occurred further comprises:
    monitoring the global positioning coordinates of the guardian device;
    monitoring a motion sensor; and
    activating the alarm upon unauthorized removal.

4. The method according to claim 1, further comprising receiving the removal authentication signal from a removal authentication device associated with the target recipient, wherein the removal authentication signal contains a removal code.

5. The method according to claim 1, further comprising forwarding to the removal authentication device directions to the guardian device.

6. The method according to claim 1, further comprising detecting a new identifier by the guardian device;
    sending from the guardian device a drop activation request to the removal authentication device; and
    confirming a dropping of a new item with the new identifier in the communication reach of the guardian device.

7. The method according to claim 1,
    wherein the guardian device comprises a camera adapted for monitoring the communication reach of the guardian device, and
    wherein the enabling of the authorized removal is activated by a face recognition system.

8. A mobile guardian device for delivering an item to a target recipient, comprising:
    a wireless communication system, configured to:
        send, in response to an arrival of the mobile guardian device at a first location pursuant to a relocating of the mobile guardian device from a previous first location to the first location, a set of global positioning system coordinates corresponding to the first location to a delivery service management system, wherein the previous first location is a location at which the mobile guardian device has been accepting deliveries;
        detect an item delivered to a second location that is a non-enclosed area that is external to the mobile guardian device and is within a communication reach of the guardian device; and
        register the item on the guardian device via a communication between an identifier on the item and the guardian device; and
    an item protection system configured to:
        activate an item protection status in which an unauthorized removal of the item from the second location is detected; and
        enable, in response to receipt of a removal authentication signal from the target recipient, an authorized removal of the item from the second location.

9. The guardian device according to claim 8, the item protection system further comprising:

a set of sensors configured to:
  detect whether an unauthorized removal of the guardian device from the first location has occurred; and
  detect whether a number of recognized removal authentication devices exceeds a predetermined threshold number in an area of the communication reach; and
an alarm system configured to triggering an alarm in response to any of: an unauthorized removal of the item from the second location, an unauthorized removal of the guardian device from the first location has occurred, or that a number of recognized removal authentication devices exceeds a predetermined threshold number in an area of the communication reach.

10. The guardian device according to claim 9, wherein the set of sensors further comprises a global positioning sensor and a movement sensor, and wherein the alarm system is further configured to trigger an alarm if the guardian device is moved away from the first position.

11. The guardian device according to claim 8, wherein the wireless communication system is further configured to receive the authentication signal from a removal authentication device associated with the target recipient, wherein the removal authentication signal contains a removal code.

12. The guardian device according to claim 8, wherein the wireless communication system is further configured to forward to removal authentication device directions to the second area.

13. The guardian device according to claim 8, further comprising:
  a camera adapted for monitoring the communication reach of the guardian device; and
  a face recognition system that enables the authorized removal in response to a recognition of a face associated with the target recipient.

14. A computer program product for controlling delivery of an item to a target recipient, the computer program product comprising a computer readable storage medium, having program instructions embodied therewith, the program instructions being executable by one or more computing systems associated with a mobile guardian device to cause the one or more computing systems to:
  send, in response to an arrival of the mobile guardian device at a first location pursuant to a relocating of the mobile guardian device from a previous first location to the first location, a set of global positioning system coordinates corresponding to the first location to a delivery service management system, wherein the previous first location is a location at which the mobile guardian device has been accepting deliveries;
  detect, at the first location occupied by the guardian device, an item delivered to a second location that is a non-enclosed area that is external to the mobile guardian device and is within a communication reach of the guardian device;
  register the item via a communication between an identifier on the item and the guardian device;
  activate an item protection status in which an unauthorized removal of the item from the second location is detected; and
  enable, in response to receipt of a removal authentication signal from the target recipient, an authorized removal of the item from the second location by the guardian device.

15. The program product according to claim 14, the program instructions further causing the one or more computing systems to:
  detect whether an unauthorized removal of the guardian device from the first location has occurred;
  detect whether a number of recognized removal authentication devices exceeds a predetermined threshold number in an area of the communication reach; and
  trigger an alarm in response to any of: an unauthorized removal of the item from the second location, an unauthorized removal of the guardian device from the first location has occurred, or that a number of recognized removal authentication devices exceeds a predetermined threshold number in an area of the communication reach.

16. The program product according to claim 15, wherein the detection of whether an unauthorized removal of the guardian device from the first location has occurred further comprises:
  monitoring the global positioning coordinates of the guardian device; and
  monitoring a motion sensor.

17. The program product according to claim 14, the program instructions further causing the one or more computing systems to:
  detect a new identifier by the guardian device;
  send from the guardian device a drop activation request to the removal authentication device; and
  confirm a dropping of a new item with the new identifier in the communication reach of the guardian device.

18. The method according to claim 14,
  wherein the guardian device comprises a camera adapted for monitoring the communication reach of the guardian device, and
  wherein the enabling of the authorized removal is activated by a face recognition system.

* * * * *